(12) United States Patent
Baldemair et al.

(10) Patent No.: US 11,601,962 B2
(45) Date of Patent: Mar. 7, 2023

(54) PRIORITIZATION OF SCHEDULING REQUEST AND ACK/NACK

(71) Applicant: TELEFONAKTIEBOLAGET LM ERICSSON (PUBL), Stockholm (SE)

(72) Inventors: Robert Baldemair, Solna (SE); Sorour Falahati, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 16/975,098

(22) PCT Filed: Feb. 26, 2019

(86) PCT No.: PCT/IB2019/051543
§ 371 (c)(1),
(2) Date: Aug. 21, 2020

(87) PCT Pub. No.: WO2019/162929
PCT Pub. Date: Aug. 29, 2019

(65) Prior Publication Data
US 2020/0396759 A1 Dec. 17, 2020

Related U.S. Application Data

(60) Provisional application No. 62/635,240, filed on Feb. 26, 2018.

(51) Int. Cl.
*H04W 72/12* (2009.01)
*H04W 76/11* (2018.01)
(Continued)

(52) U.S. Cl.
CPC ...... *H04W 72/1284* (2013.01); *H04B 7/0413* (2013.01); *H04L 1/0061* (2013.01);
(Continued)

(58) Field of Classification Search
None
See application file for complete search history.

(56) References Cited

U.S. PATENT DOCUMENTS

2009/0109917 A1 4/2009 Pajukoski et al.
2010/0098011 A1 4/2010 Pelletier et al.
(Continued)

FOREIGN PATENT DOCUMENTS

CN 104854940 A 8/2015
CN 106165517 A 11/2016
(Continued)

OTHER PUBLICATIONS

International Search Report and Written Opinion for PCT/IB2019/051543; dated Jun. 26, 2019; 13 pages.

*Primary Examiner* — Anh Vu H Ly
(74) *Attorney, Agent, or Firm* — Ericsson Inc.

(57) ABSTRACT

Systems and methods for determining priority of different types of overlapping transmission are provided. When an ACK/NACK PUCCH resource overlaps with a scheduling request PUCCH resource, based on the determined relative priorities of the ACK/NACK and the scheduling request, a wireless device can determine which transmission should be prioritized and transmitted.

24 Claims, 8 Drawing Sheets

(51) Int. Cl.
  *H04B 7/0413* (2017.01)
  *H04L 1/00* (2006.01)
  *H04L 1/1829* (2023.01)
  *H04L 5/00* (2006.01)
  *H04W 72/04* (2023.01)
  *H04W 72/10* (2009.01)

(52) U.S. Cl.
  CPC .......... *H04L 1/1854* (2013.01); *H04L 5/0055* (2013.01); *H04W 72/042* (2013.01); *H04W 72/10* (2013.01); *H04W 76/11* (2018.02)

(56) References Cited

U.S. PATENT DOCUMENTS

| | | |
|---|---|---|
| 2015/0312922 A1 | 10/2015 | Uchino et al. |
| 2016/0088537 A1 | 3/2016 | Uchino et al. |
| 2017/0188311 A1 | 6/2017 | Hwang et al. |
| 2018/0110066 A1* | 4/2018 | Luo .................. H04W 72/1284 |
| 2019/0261391 A1* | 8/2019 | Kundu .............. H04W 72/0446 |

FOREIGN PATENT DOCUMENTS

| | | |
|---|---|---|
| EP | 2934055 A1 | 10/2015 |
| EP | 3125633 A1 | 2/2017 |
| EP | 3131351 A1 | 2/2017 |
| JP | 2011502415 A | 1/2011 |
| JP | 2014116865 A | 6/2014 |
| JP | 2014220689 A | 11/2014 |
| JP | 2016143913 A | 8/2016 |
| JP | 2017516362 A | 6/2017 |
| RU | 2588029 C2 | 11/2015 |
| WO | 2013051983 A1 | 4/2013 |
| WO | 2017/016337 A1 | 2/2017 |
| WO | 2017016337 A1 | 2/2017 |

* cited by examiner

PRIORITIZATION OF SCHEDULING REQUEST AND ACK/NACK

CROSS REFERENCE TO RELATED APPLICATIONS

This application claims the benefit of U.S. Provisional Application No. 62/635,240 filed on Feb. 26, 2018, the entire contents of which are hereby incorporated by reference.

TECHNICAL FIELD

The present disclosure generally relates to wireless communications and wireless communication networks.

INTRODUCTION

The architecture for New Radio (NR) (also known as 5G or Next Generation) is being discussed in standardization bodies such as 3GPP. NR aims to enable new use cases requiring further enhanced data rates, latency, coverage, capacity, and reliability. This can be accomplished with improved network energy performance and the ability to exploit spectrum in very high frequency bands. Some key technology components to reach these targets include flexible numerology, latency-optimized frame structure, massive MIMO, interworking between high and low frequency bands, and ultra-lean transmissions.

The conventional way of controlling data transmission in NR is scheduling in a similar manner as in LTE. Each wireless device monitors one or more physical downlink control channel(s) (PDCCHs). Upon detection of a valid PDCCH, the device follows the scheduling decision and transmits or receives data.

Uplink control information such as hybrid ARQ acknowledgments, channel-state feedback for multi-antenna operation, and scheduling request (SR) for uplink data awaiting transmission are transmitted using the physical uplink control channel (PUCCH). There are different PUCCH formats, depending on the amount of information and the duration of the PUCCH transmission.

NR conventionally supports five different PUCCH formats.

PUCCH format 0: PUCCH format 0 can be 1 or 2 symbols long (with or without frequency-hopping) and can carry 1 or 2 bit ACK/NACK together with at most 2 SR bit. This format uses sequence selection, i.e. the UCI bit(s) select one out of N sequences where N is determined by the number of UCI bits to transmit. PUCCH format 0 is always 1 PRB wide.

PUCCH format 1: PUCCH format 1 can be 4 to 14 symbols long (with or without frequency-hopping) and can carry 1 or 2 bit ACK/NACK bits. Besides its length variability is very similar to PUCCH format 1a/1b in LTE. If ACK/NACK should be transmitted simultaneously with SR, the PUCCH transmissions occurs not on the ACK/NACK resource but on a RRC configured SR resource. PUCCH format 1 is always 1 PRB wide.

PUCCH format 2: PUCCH format 2 can be 1 or 2 symbols long (with or without frequency-hopping) and can carry 3 or more (up to several 10 bits) ACK/NACK bits together with CSI and SR, if configured. PUCCH format 2 encodes the UCI information and transmits the encoded UCI over sub-carriers of one or two OFDM symbols. To accommodate larger payloads PUCCH format 2 can extend over multiple PRBs.

PUCCH format 3: PUCCH format 3 can be 4 to 14 symbols long (with or without frequency-hopping) and can carry 3 to a few hundred of bits together with CSI and SR, if configured. PUCCH format 3 encodes the UCI bits, maps it to complex QPSK symbols, splits the symbol sequence into one part for each OFDM symbol carrying UCI, and applies DFTS-OFDM precoding prior OFDM modulation. PUCCH format 3 offers the largest payloads size across all NR PUCCH formats. To accommodate larger payloads PUCCH format 3 can extend over multiple PRBs.

PUCCH format 4: PUCCH format 4 can be 4 to 14 symbols long (with or without frequency-hopping) and can carry 3 to several tens of bits together with CSI and SR, if configured. PUCCH format 4 is very similar to PUCCH format 3, with two exceptions: It can multiplex up to 4 users on the same time-frequency resource by using OCC multiplexing prior DFTS-OFDM precoding and it is restricted to a single PRB.

Each wireless device can be configured with one or multiple scheduling request (SR) configurations (e.g. up to 8) per cell group. The RRC information element SchedulingRequestResourceConfig associates a schedulingRequestID with a SchedulingRequestResourceId. The SchedulingRequestResourceId identifies the physical resource (i.e. PUCCH) as well as periodicity and offset. The schedulingRequestID is associated with a logical channel, if a logical channel requires UL resources, the associated scheduling request with schedulingRequestID is triggered. Note that a scheduling request ID schedulingRequestID can be mapped to multiple PUCCH resources, i.e. there can be several SchedulingRequestResourceConfig that map/link to the same schedulingRequestID. Hence the ID space of SchedulingRequestResourceConfig can be larger or equal to the ID space of the schedulingRequestID.

FIG. 1 illustrates an example where one scheduling request ID schedulingRequestID (SR 0) is mapped to multiple configured PUCCH resources (PUCCH resource 0, PUCCH resource 1, PUCCH resource 2) corresponding to multiple SchedulingRequestResourceConfig configurations. Some scenarios may exist where a scheduling request overlaps with other signaling.

SUMMARY

It is an object of the present disclosure to obviate or mitigate at least one disadvantage of the prior art.

There are provided systems and methods for determining relative priority of different types of overlapping PUCCH resource transmissions.

In an aspect of the present disclosure there is provided a method performed by a wireless device. The wireless device can comprise a radio interface and processing circuitry and be configured to determine that an acknowledgement/negative acknowledgement (ACK/NACK) transmission and a scheduling request (SR) transmission will overlap in Physical Uplink Control Channel (PUCCH) resources. The wireless device can determine a priority associated with the ACK/NACK transmission, and compare the priority associated with the ACK/NACK transmission with a priority associated with the SR transmission to determine which transmission has a higher relative priority. The wireless device can transmit the transmission with the higher relative priority.

In some embodiments, the wireless device can further determine a priority associated with the SR transmission. The priority associated with the SR transmission can be determined in accordance with a priority level associated with a logical channel associated with the SR transmission.

In some embodiments, the priority associated with the ACK/NACK transmission can be determined in accordance with at least one of a Physical Downlink Control Channel (PDCCH) property, a Physical Downlink Shared Channel (PDSCH) property and a PUCCH property.

In some embodiments, the priority associated with the ACK/NACK transmission can be determined at least in part based on a characteristic of a scheduling PDCCH transmission. The characteristic can include at least one of a search space and/or a control resource set used for the PDCCH transmission. In some embodiments, the priority level of the search space can be derived from a periodicity of the search space.

In some embodiments, the priority associated with the ACK/NACK transmission can be determined at least in part based on an aggregation level associated with the PDCCH.

In some embodiments, the priority associated with the ACK/NACK transmission can be determined at least in part based on a Downlink Control Information (DCI) message transmitted on the PDCCH. The DCI message can include at least one of a modulation and coding scheme, a code rate, a modulation order, an indication of reference signal pattern, a time-domain resource allocation, a cyclic redundancy check (CRC) length, and/or a multiple input multiple output (MIMO) transmission scheme.

In some embodiments, the priority associated with the ACK/NACK transmission can be determined at least in part based on a Radio Network Temporary Identifier (RNTI) value associated with the wireless device.

In some embodiments, the priority associated with the ACK/NACK transmission can be determined at least in part based on a priority level associated with a PUCCH resource carrying the ACK/NACK transmission.

In some embodiments, responsive to determining the ACK/NACK transmission and the SR transmission have a same relative priority, the wireless device can transmit the transmission having an earlier transmission time.

In some embodiments, the wireless device can further cancel and/or interrupt the transmission with a lower relative priority.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
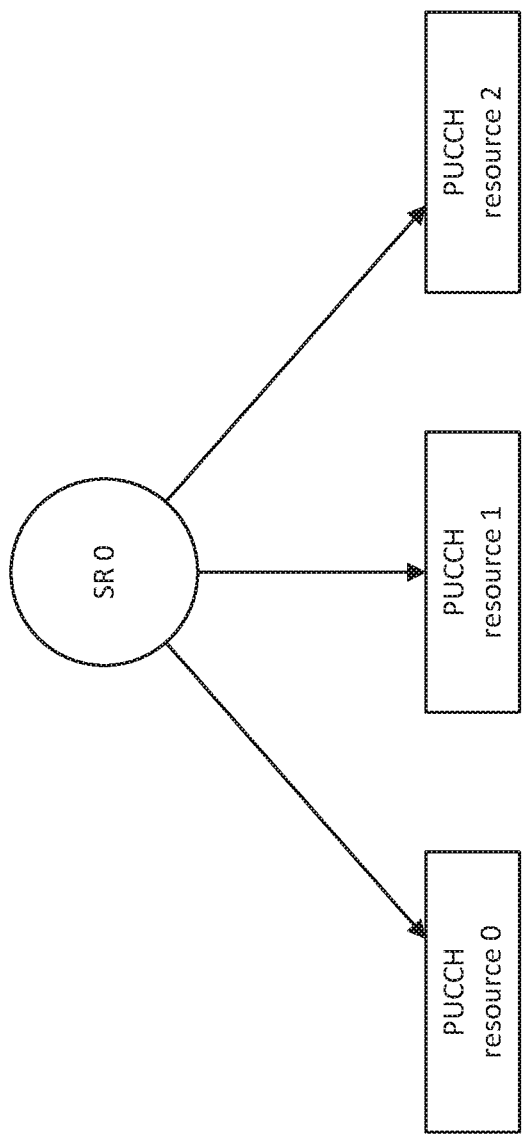
FIG. 1 illustrates an example scheduling request.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB 1, etc. Example embodiments of a UE are described in more detail below with respect to FIG. 7.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 9.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 2:
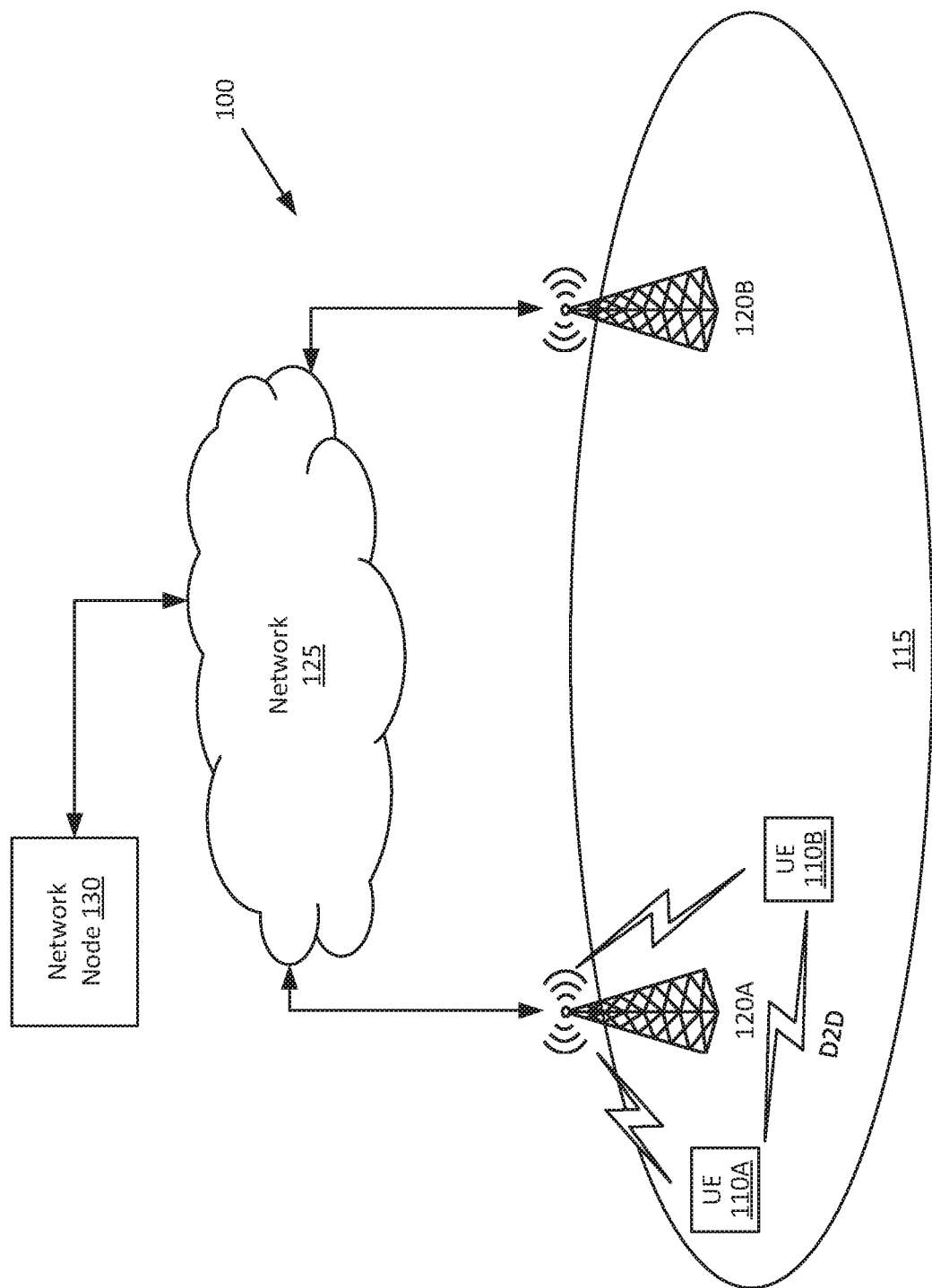
FIG. 2 illustrates an example wireless network.

FIG. 2 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

There are no conventional standardized behaviors in NR for the scenario when PUCCH carrying ACK/NACK and PUCCH carrying SR collide, for the case when the ACK/NACK transmission cannot piggyback the SR. In LTE, the PUCCH message with an ACK/NACK "wins" in this case, and the SR is dropped in the case that not both channels can be transmitted.

NR also supports Ultra-Reliable Low Latency Communication (URLLC). To achieve low latency, it may be necessary to interrupt/puncture/not transmit/stop an PUCCH transmission with ACK/NACK. This behavior could be desirable if SR is associated with a high priority (highest priority or priority above a threshold) logical channel and ACK/NACK is in response to a DL retransmission of lower priority. In case ACK/NACK corresponds to a high priority DL transmission it is less obvious that PUCCH carrying SR should puncture/stop the ongoing PUCCH transmission with ACK/NACK.

Figure 3A:
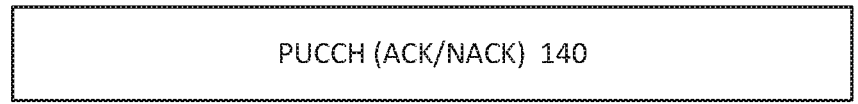
FIG. 3 illustrates examples of overlapping PUCCH resources.
Figure 3B:
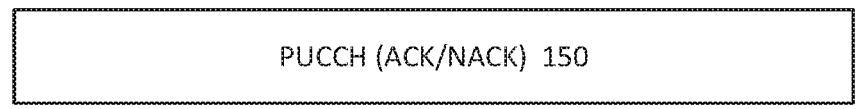

FIG. 3 illustrates two examples of overlapping transmissions. In FIG. 3a, in a first example, a long PUCCH carrying ACK/NACK (140) overlaps with one or multiple short PUCCH resources configured to carry SR(s) (142, 144, 146). In FIG. 3b, in a second example, a long PUCCH carrying ACK/NACK (150) overlaps another long PUCCH configured for SR (152). In the examples of FIG. 3, the PUCCH with ACK/NACK starts before the PUCCH configured for SR, but the other case can be envisioned as well. PUCCH configured for SR can start before, or at the same time as, ACK/NACK but overlap the PUCCH for ACK/NACK with at least one symbol. It is currently undefined when to transmit the SR and when to transmit the ACK/NACK (e.g. if PUCCH carrying ACK/NACK cannot piggyback SR).

Some embodiments will describe determining when to drop ACK/NACK and when to drop SR based on a relative priority between SR and ACK/NACK in case of an overlap between the PUCCH resources. The priority for ACK/NACK can be derived from properties of the PDCCH or PDSCH and/or properties of the PUCCH format carrying ACK/NACK.

Accordingly, some embodiments enable transmission of a high priority ACK/NACK in the case that it overlaps with a low priority SR. However, a low priority SR may not interrupt a high priority ACK/NACK. On the other hand, a high priority SR can interrupt a low priority ACK/NACK.

In some embodiments, a wireless device has a PUCCH resource for ACK/NACK that starts before/at the same time as PUCCH resource for SR and is due to transmit ACK/NACK. When the wireless device triggers a scheduling request and, depending on the relative priority between the ACK/NACK and SR, either PUCCH with ACK/NACK is transmitted and SR is dropped or PUCCH with ACK/NACK is dropped and PUCCH with SR is transmitted. In the case where PUCCH with ACK/NACK is dropped, this could imply that PUCCH with ACK/NACK is stopped/interrupted after its transmission has already started, or alternatively, if the priority decision happens just before PUCCH ACK/NACK transmission, transmission of PUCCH with ACK/NACK does not even start. SR cannot be piggybacked to ACK/NACK PUCCH (even if the ACK/NACK PUCCH format would support that) since the SR was triggered too late.

The opposite scenario is also possible. A PUCCH carrying SR has already started and overlaps with a PUCCH that should transmit ACK/NACK. Depending on the relative priority between SR and ACK/NACK, either SR is stopped/interrupted and ACK/NACK transmitted, or the SR transmission continues. As previously described, it might be so that an SR transmission does not start if the decision to prioritize ACK/NACK is determined before the SR transmission starts.

In a case of equal priority between SR and ACK/NACK, both behaviors (transmit ACK/NACK, drop SR, or vice versa) can be envisioned. It may be preferred in this case to transmit ACK/NACK or the PUCCH that starts earlier.

Depending on the relative priority between the ACK/NACK and SR transmissions, either the PUCCH carrying ACK/NACK or the PUCCH carrying SR can be prioritized. The lower priority PUCCH transmission can be either stopped or never started, if a priority decision happens early enough.

A SR is associated with a logical channel (or logical channel group) and logical channels (or logical channel groups) have associated priority levels. Therefore, a priority of a SR can be derived, either explicitly or implicitly, from the logical channel. To compare a SR priority with an ACK/NACK priority, the ACK/NACK also needs a priority level. Conventionally, no concepts have been defined related to determining a priority level of an ACK/NACK transmission.

Figure 4:
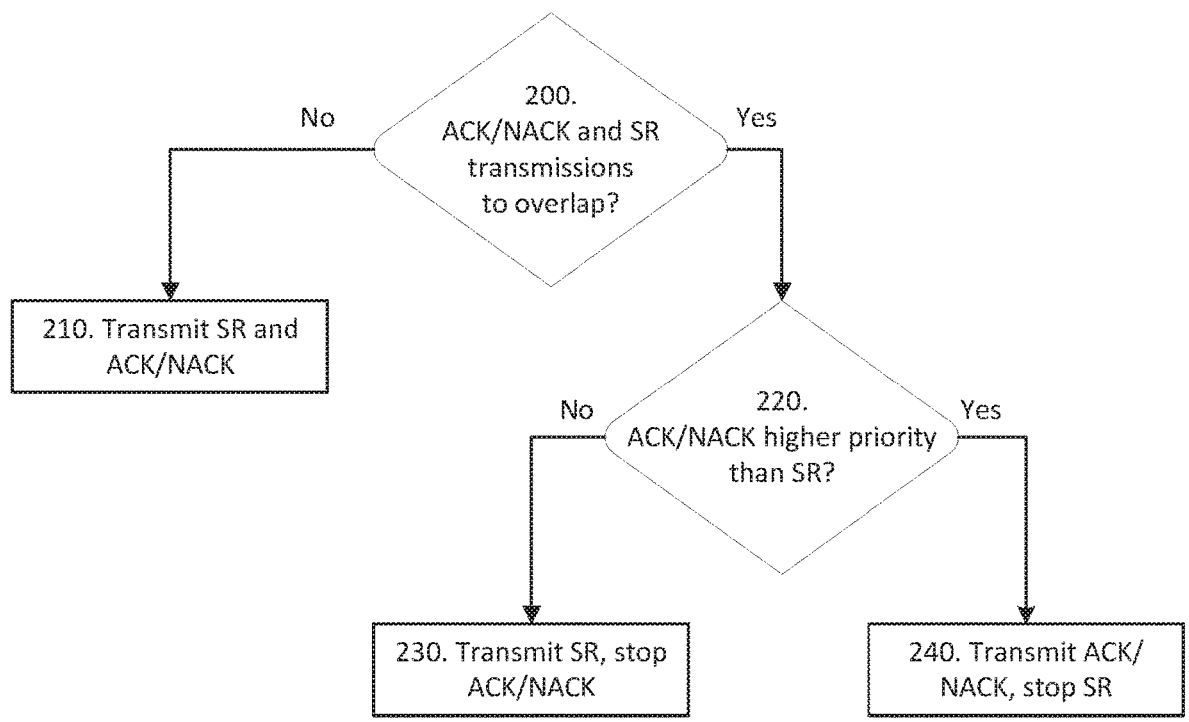
FIG. 4 is a flow chart illustrating a method which can be performed in a wireless device.

FIG. 4 is a flow chart illustrating a method for determining PUCCH transmission priority which can be performed in a wireless device. A wireless device has both a PUCCH including an ACK/NACK and a PUCCH including a SR for transmission. It can be determined if the ACK/NACK transmission and the SR transmission will overlap (step 200). The overlap can be in PUCCH resources such as time and/or frequency resources. In response to determining that there is no overlap, both the ACK/NACK and SR messages can be transmitted (step 210). In response to determining that there is an overlap, the relative priority of the transmissions can be determined (step 220). Responsive to determining that SR has a higher priority than the ACK/NACK, the SR message can be transmitted and the ACK/NACK message can be stopped or cancelled (step 230). Responsive to determining that ACK/NACK has a higher priority than the SR, the ACK/NACK message can be transmitted and the SR message can be stopped or cancelled (step 240).

Figure 5:
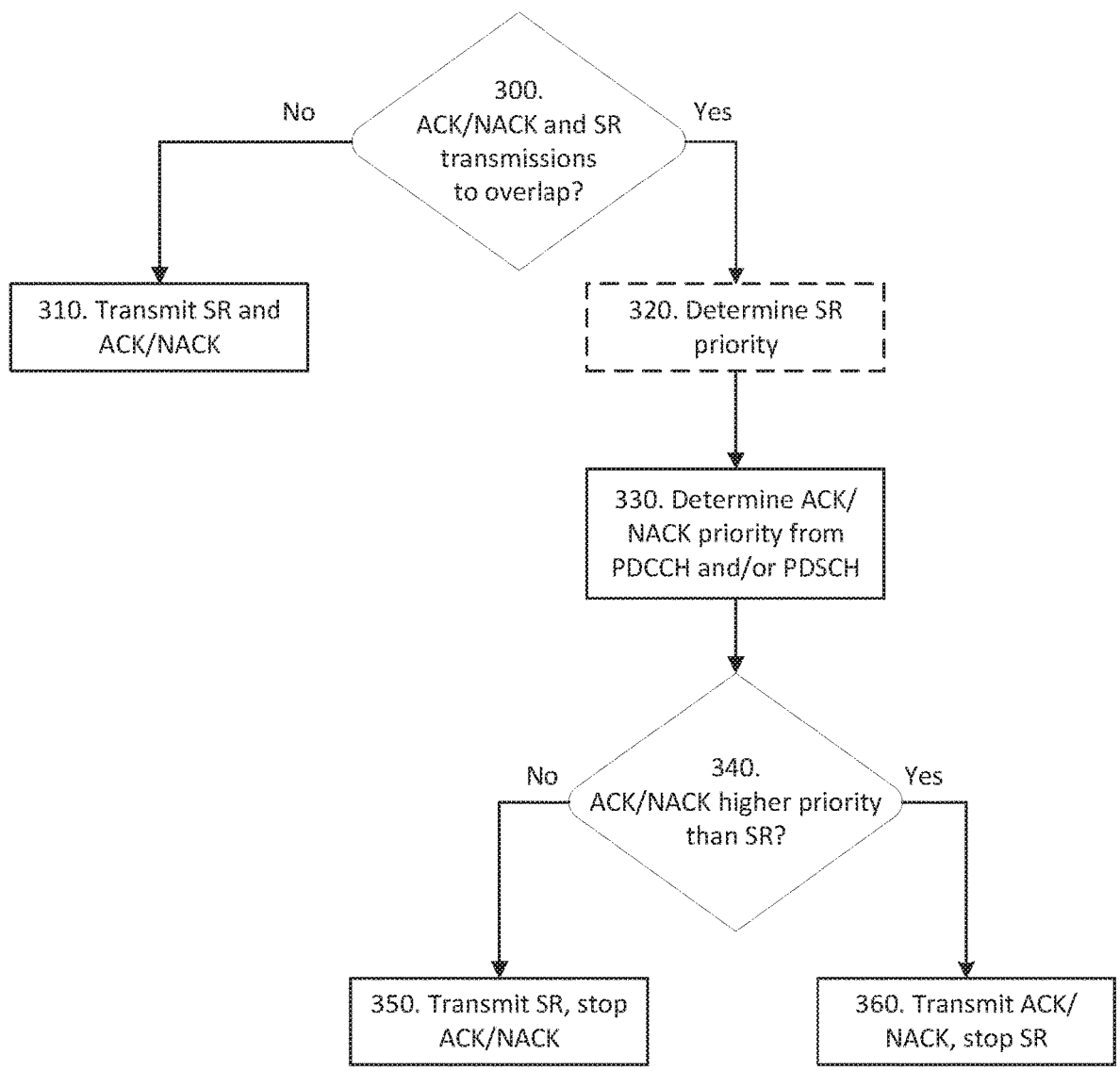
FIG. 5 is a flow chart illustrating a method for determining priority from PDSCH transmission.

FIG. 5 is a flow chart illustrating a method which can be performed in a wireless device, such as UE 110. The method can include determining a priority level based at least in part on a PDSCH transmission that a ACK/NACK transmission is in response to.

Step 300: Determine if the wireless device has an ACK/NACK PUCCH transmission and a SR PUCCH transmission will overlap in time and/or frequency resources.

Step 310: Responsive to determining that the ACK/NACK PUCCH transmission and the SR PUCCH transmission will not overlap, transmitting both the ACK/NACK and SR transmissions.

Step 320: Responsive to determining that the ACK/NACK PUCCH transmission and the SR PUCCH transmission will overlap, determining a priority of the SR PUCCH transmission.

Step 330: Responsive to determining that the ACK/NACK PUCCH transmission and the SR PUCCH transmission will overlap, determining a priority of the ACK/NACK PUCCH transmission. The priority of the ACK/NACK can be determined at least in part based on the PDSCH transmission that the ACK/NACK is in response to.

Step 340: The priority of the ACK/NACK PUCCH transmission and the SR PUCCH transmission are compared to determine which transmission has a higher relative priority.

Step 350: Responsive to determining that the SR PUCCH transmission has a higher priority than the ACK/NACK PUCCH transmission, transmitting the SR and stopping/dropping/cancelling the ACK/NACK transmission.

Step 360: Responsive to determining that the ACK/NACK PUCCH transmission has a higher priority than the SR PUCCH transmission, transmitting the ACK/NACK and stopping/dropping/cancelling the SR transmission.

It will be appreciated that one or more of the above steps can be performed simultaneously and/or in a different order. Also, steps illustrated in dashed lines are optional and can be omitted in some embodiments. Further details with respect to determining the priority of the transmissions (e.g. steps 320, 330, 340) will be provided below.

In some embodiments, the priority level of the PDSCH (and thus the priority of ACK/NACK can be the same as or at least derived from) can be derived from a physical characteristic of the scheduling PDCCH transmission or from information contained in the Downlink Control Information (DCI) transmitted on the PDCCH.

Physical layer characteristics of the PDCCH transmission can include the search space and/or control resource set that is used for transmitting the PDCCH. The search space together with control resource set describe the time-frequency domain resources (plus other parameters such as scrambling, interleaving, etc.) where a UE tries to detect a PDCCH candidate addressed to the UE (in the following, search space can refer to NR search space or to the combination of NR search space and NR control resource set). Different search spaces could be assigned/configured with different priority levels. For example, a search space that is intended for high priority transmissions (and thus is tagged with high priority) may occur very frequent in time while a search space intended for less prior transmissions (and is therefore tagged with a lower priority) (e.g. MBB) may occur less frequent in time. Accordingly, a search space can be directly tagged with a priority level. In absence of such functionality, a priority level can be derived from the periodicity of the search space (frequent occurrence: higher importance, less frequent occurrence: lower priority). A PDCCH transmitted in a search space inherits the priority level from the search space.

One example is to assume some periodicity values for search space have higher associated priority than any SR priority. Another example is to assume search space periodicities that are more frequent than a SR periodicity have higher associated priority than SR and vice versa.

In some embodiments, the priority of the PDCCH can also be associated with the aggregation level used for transmission of the PDCCH. The aggregation level of the PDCCH denotes the amount of time-frequency resources used for transmission of PDCCH. A high priority PDCCH may be scheduled with a higher aggregation level than a low priority PDCCH, since more resources (e.g. higher aggregation level) leads to higher reliability.

In NR, the payload of a DCI is appended by a cyclic redundancy check (CRC) and channel encoded. The CRC is then scrambled with different UE identities (e.g. the Radio Network Temporary Identifier, RNTI). The UE, when trying to detect a PDCCH, performs blind decoding across a set of PDCCH candidates and during decoding, checks if the de-scrambled CRC (e.g. de-scrambled with RNTI value(s) it is configured with) matches the CRC of the decoded payload. If a match exists, the UE has detected a PDCCH addressed to it.

In some embodiments, a UE can be configured with different RNTI values and at least two RNTI values can correspond to different priority levels (e.g. RNTI and association with priority level can be part of the configuration or can follow a pre-defined rule). The gNB can use a RNTI corresponding to a high priority for scheduling a high priority PDSCH and use a low priority RNTI for scheduling less critical PDSCH.

In some embodiments, content within the DCI could, explicitly or implicitly, indicate priority. An example of explicit indication would be a field in the DCI indicating priority level of the scheduled PDSCH. Examples of implicit information include an MCS index, MCS table, indicated coding scheme, indication of certain reference signal pattern, time-domain resource allocation, MIMO transmission scheme, etc.

In case of high priority transmission an MCS with low code rate and/or modulation order can be used. PDSCH with a code rate/modulation order below a certain (configured) threshold can be classified as high priority while transmissions with a code rate/modulation order above the threshold can be low priority. In some embodiments, for high priority transmissions, a specific MCS table can be used with more entries at lower spectrum efficiency values (higher reliability) or code rates. Usage of this MCS table can indicate a high priority transmission.

A DCI may indicate to use different channel coding schemes for PDSCH, e.g. LDPC, polar code, Turbo codes, etc. Some channel codes can be associated with high priority PDSCH transmissions while other channel coding schemes can correspond to low priority PDSCH transmissions.

The DCI may indicate different MIMO transmission schemes, e.g. spatial multiplexing, beamforming, or transmit diversity for PDSCH. For example, transmit diversity can be associated with a high priority PDSCH transmissions while the other MIMO schemes can be associated with low priority PDSCH transmissions. The DCI can also indicate a reference signal pattern to use or that the transmission includes certain types of reference signals. The presence of certain reference signal types and/or a reference signal configuration (e.g. density of DM-RS) may indicate a priority level.

The DCI contains a time-domain resource allocation table. Short PDSCH transmissions (below a configured threshold) can correspond to high priority PDSCH transmissions while longer transmissions can correspond to lower priority.

The DCI can indicate a certain CRC length to be used for the PDSCH. There can be a mapping between CRC length (or CRC polynomial) and priority.

In some embodiments, a high priority PDSCH transmission can be scheduled with a specific DCI format, e.g. a small (compact) DCI to increase PDCCH transmission robustness. The priority level can be derived from the DCI format.

The above listed physical characteristics of a PDCCH and DCI fields are provided as non-limiting examples, other parameters can be envisioned as well. Further, instead of indicating all parameters in DCI, some parameters can also be semi-statically configured. Different configuration values can then correspond to different priority levels.

Accordingly, parameters configured for PDSCH or characteristics of the PDSCH transmission can be used to determine the priority of the associated ACK/NACK transmission. In principle, many of the PDCCH/DCI parameters can also be interpreted as PDSCH parameters (e.g. the time-domain resource allocation for PDSCH signaled in the PDCCH is also a PDSCH property).

Figure 6:
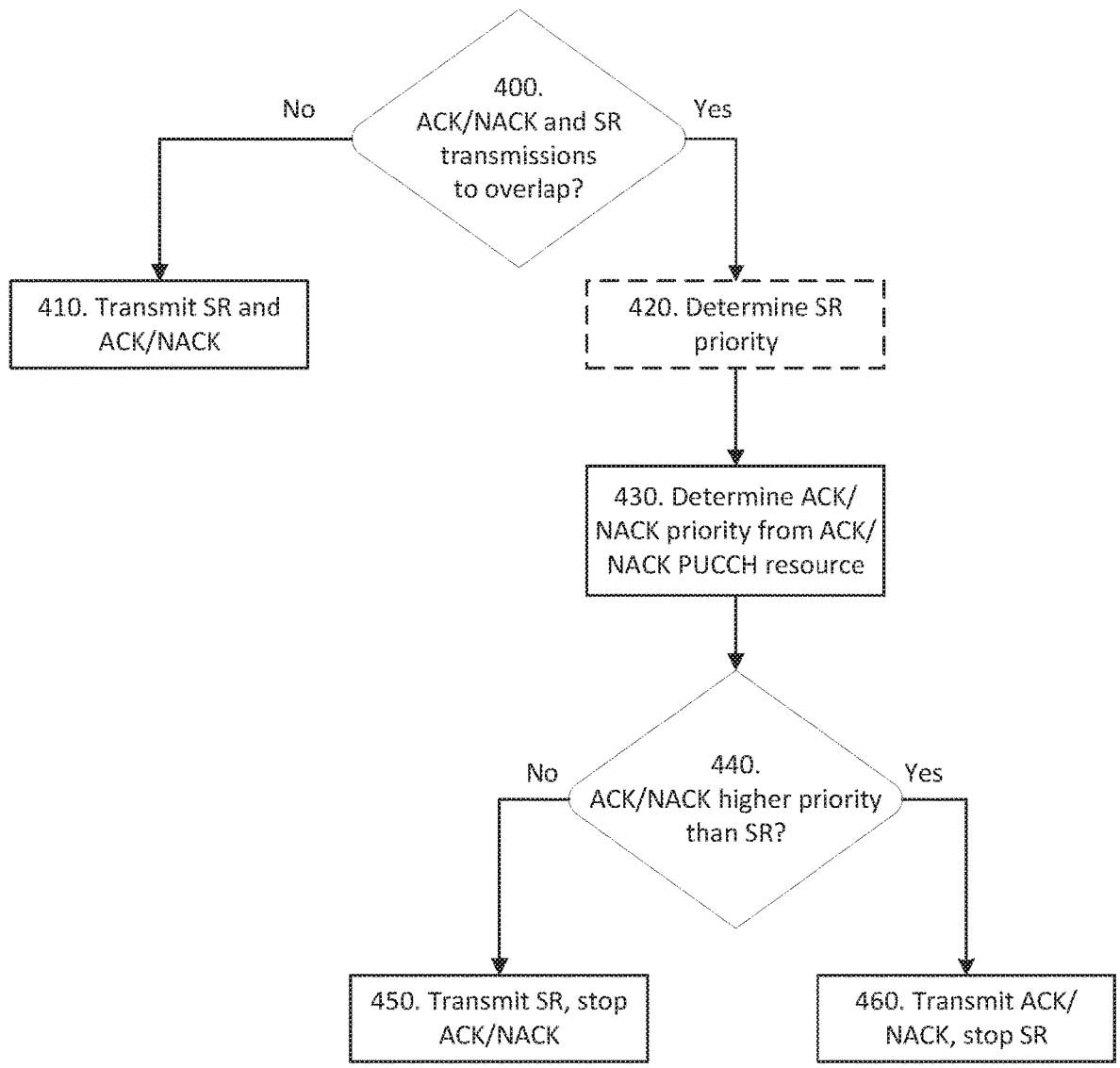
FIG. 6 is a flow chart illustrating a method for determining priority from PUCCH resource.

FIG. 6 is a flow chart illustrating a method which can be performed in a wireless device, such as UE 110. The method can include determining a priority level based at least in part on a PUCCH resource carrying an ACK/NACK.

In some embodiments, as part of the PUCCH configuration, a PUCCH resource can be configured with a priority level.

Step 400: Determine if the wireless device has an ACK/NACK PUCCH transmission and a SR PUCCH transmission will overlap in time and/or frequency resources.

Step 410: Responsive to determining that the ACK/NACK PUCCH transmission and the SR PUCCH transmission will not overlap, transmitting both the ACK/NACK and SR transmissions.

Step 420: Responsive to determining that the ACK/NACK PUCCH transmission and the SR PUCCH transmission will overlap, determining a priority of the SR PUCCH transmission.

Step 430: Responsive to determining that the ACK/NACK PUCCH transmission and the SR PUCCH transmission will overlap, determining a priority of the ACK/NACK PUCCH transmission. The priority of the ACK/NACK can be determined at least in part based on the PUCCH resource carrying the ACK/NACK transmission.

Step 440: The priority of the ACK/NACK PUCCH transmission and the SR PUCCH transmission are compared.

Step 450: Responsive to determining that the SR PUCCH transmission has a higher priority than the ACK/NACK PUCCH transmission, transmitting the SR and stopping/dropping/cancelling the ACK/NACK transmission.

Step 460: Responsive to determining that the ACK/NACK PUCCH transmission has a higher priority than the SR PUCCH transmission, transmitting the ACK/NACK and stopping/dropping/cancelling the SR transmission.

It will be appreciated that one or more of the above steps can be performed simultaneously and/or in a different order. Also, steps illustrated in dashed lines are optional and can be omitted in some embodiments. Further details with respect to determining the priority of the transmissions (e.g. steps 420, 430, 440) will be provided below.

In some embodiments, only priority levels of "high" or "low" may be configured. In other embodiments, a more detailed configuration with multiple priority levels (e.g. a finer granular priority scale) can be configured.

In some embodiments, the priority level can be determined at least in part based on combining two or more of PDCCH/DCI/PDSCH/PUCCH_for_ACK/NACK properties. In such a case, a fixed mapping can be used that directly derives a priority level out of the e.g. PDCCH/DCI/PDSCH/PUCCH_for_ACK/NACK property (combination). Another possibility is that the PDCCH/DCI/PDSCH/PUCCH_for_ACK/NACK property (combination) is input to a function and at least one additional parameter of this function is RRC configured. This can provide better control over which PDCCH/DCI/PDSCH/PUCCH_for_ACK/NACK property (combinations) results in which priority level.

In some embodiments, comparing ACK/NACK and SR priority can be a simple comparison function. Alternatively, this comparison function can be configured, e.g. boosting/compressing ACK/NACK and/or SR priority values prior comparison. Boosting/compression parameters can be fixed or also RRC configurable.

It will be appreciated that, although embodiments are described herein with reference to PUCCH signaling, the various systems and methods can be applied to other types of messages. A wireless device can determine that it has two types of transmissions that will overlap in time and/or frequency resources. The relative priorities of the two types of transmissions can be determined in accordance with the various embodiments described herein. The wireless device can determine that a first type of transmission is prioritized over a second type and thus, can transmit a message of the first type and cancel/stop transmission of a message of the second type.

It will be appreciated that, although embodiments are described herein with reference to a wireless device determining a relative priority between PUCCH transmission, the radio access node (such as gNB 120) can be involved in the configuration and/or signaling of such a determination.

The gNB can be aware of the priority of a SR that could be transmitted at the overlapping PUCCH resource(s), however the gNB does not know if the wireless device actually sends the SR. The gNB can also be aware of the priority of an ACK/NACK (as the gNB scheduled the corresponding PDSCH). If the ACK/NACK has higher priority than the SR that is mapped to the overlapping PUCCH resources, the gNB does not need to listen to the SR PUCCH resource (since the wireless device will prioritize the ACK/NACK). If the SR that is mapped to SR PUCCH resources has a higher priority than the ACK/NACK, the gNB needs to monitor both the ACK/NACK and SR PUCCH resources. In this case, the gNB does not know if the SR will be triggered by the wireless device (and thus, the SR will be transmitted and the ACK/NACK will be dropped) or if the ACK/NACK will be transmitted.

Figure 7:
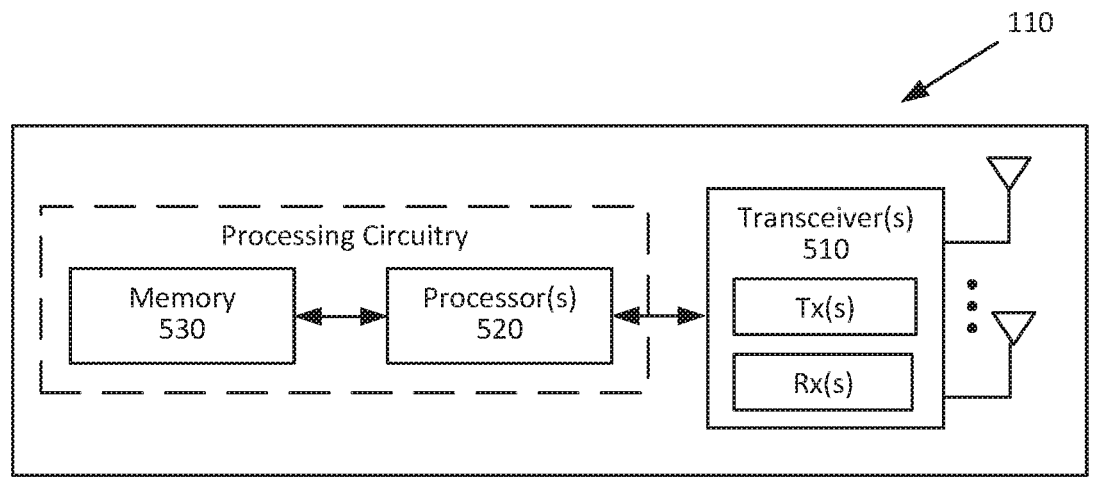
FIG. 7 is a block diagram of an example wireless device.

FIG. 7 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 7 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
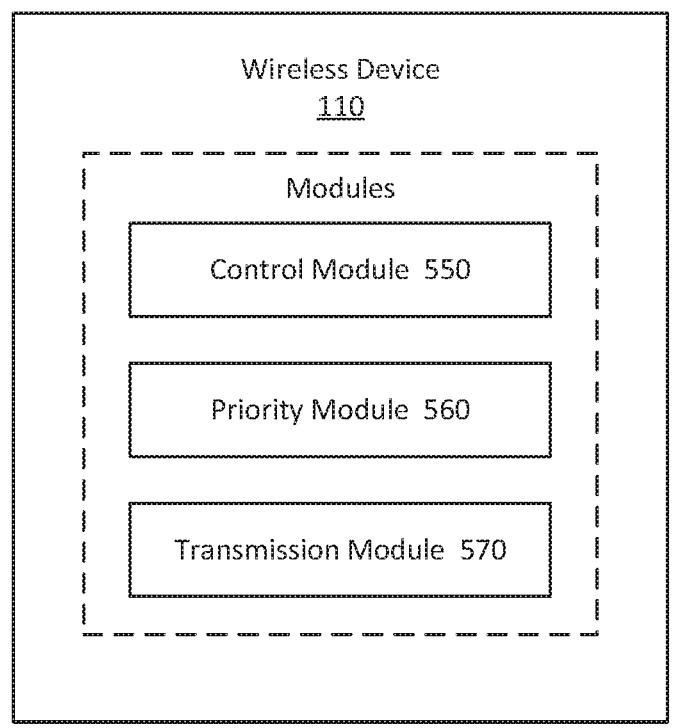
FIG. 8 is a block diagram of an example wireless device with modules.

In some embodiments, the wireless device UE 110 may comprise a series of modules configured to implement the functionalities of the wireless device described above. Referring to FIG. 8, in some embodiments, the wireless device 110 can comprise a control module 550 for determining that a first type (e.g. ACK/NACK) and a second type (e.g. SR) of PUCCH transmissions will overlap, a prioritization module 560 for determining a relative priority of the first and second types of PUCCH transmissions, and a transmission module 570 for transmitting in accordance with the determined relative priority.

It will be appreciated that the various modules may be implemented as combination of hardware and software, for instance, the processor, memory and transceiver(s) of UE 110 shown in FIG. 7. Some embodiments may also include additional modules to support additional and/or optional functionalities.

Figure 9:
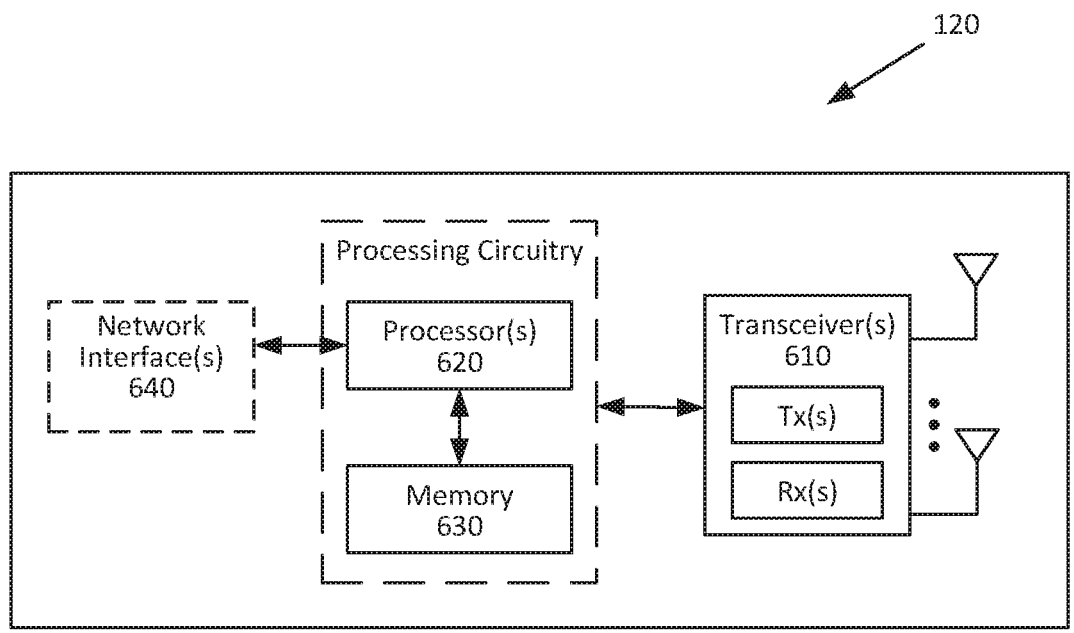
FIG. 9 is a block diagram of an example radio access node.

FIG. 9 is a block diagram of an exemplary radio access node 120, in accordance with certain embodiments. Radio access node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of radio access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of radio access node 120 can include additional components beyond those shown in FIG. 9 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 7 and 9 may be included in other network nodes (such as core network node 130). Other network nodes may optionally include or not include a wireless interface (such as the transceiver described in FIGS. 7 and 9).

Figure 10:
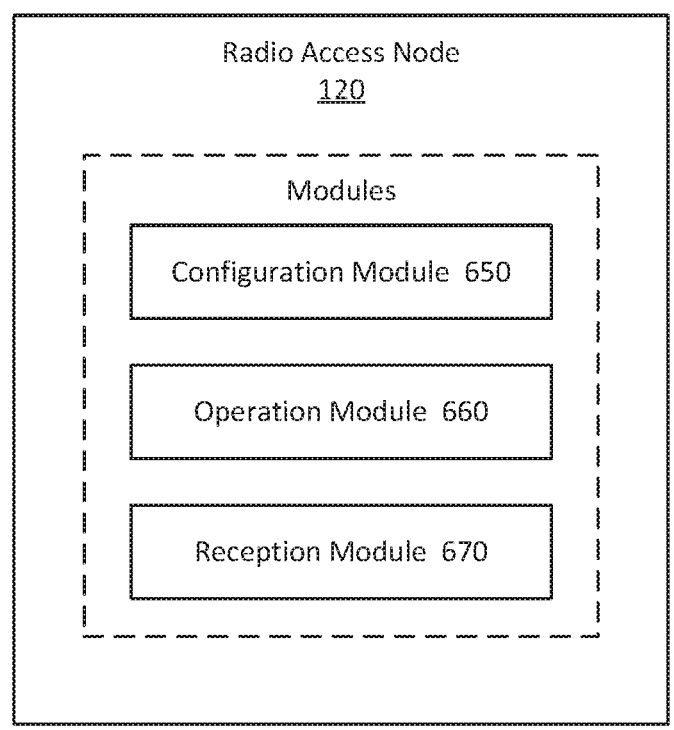
FIG. 10 is a block diagram of an example radio access node with modules.

In some embodiments, the radio access node 120, may comprise a series of modules configured to implement the functionalities of the network node described above. Referring to FIG. 10, in some embodiments, the radio access node 120 can comprise a configuration module 650 for configuring priorities associated with a first and a second type of PUCCH transmissions; an operation module 660 for performing an operational task in accordance with the configured priorities; and a reception module 670 for receiving at least one PUCCH transmission.

It will be appreciated that the various modules may be implemented as combination of hardware and software, for instance, the processor, memory and transceiver(s) of radio access node 120 shown in FIG. 9. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
- 3GPP Third Generation Partnership Project
- ACK Acknowledgement
- AP Access point
- ARQ Automatic Repeat Request
- BS Base Station
- BSC Base station controller
- BTS Base transceiver station
- CA Carrier Aggregation
- CC Component carrier
- CCCH SDU Common Control Channel SDU
- CG Cell group
- CGI Cell Global Identifier
- CQI Channel Quality information
- CSI Channel State Information
- DAS Distributed antenna system
- DC Dual connectivity
- DCCH Dedicated Control Channel
- DCI Downlink Control Information
- DFTS-OFDM Discrete Fourier Transform Spread OFDM
- DL Downlink
- DMRS Demodulation Reference Signal
- eMBB Enhanced Mobile Broadband
- eNB E-UTRAN NodeB or evolved NodeB
- ePDCCH enhanced Physical Downlink Control Channel
- E-SMLC evolved Serving Mobile Location Center
- E-UTRA Evolved UTRA
- E-UTRAN Evolved UTRAN
- FDM Frequency Division Multiplexing
- gNB next generation NodeB
- HARQ Hybrid Automatic Repeat Request
- HO Handover
- IoT Internet of Things
- LTE Long-Term Evolution
- M2M Machine to Machine
- MAC Medium Access Control
- MBMS Multimedia Broadcast Multicast Services
- MCG Master cell group
- MCS Modulation and Coding Scheme
- MDT Minimization of Drive Tests
- MeNB Master eNode B
- MIMO Multiple Input Multiple Output
- MME Mobility Management Entity
- MSC Mobile Switching Center
- MSR Multi-standard Radio
- MTC Machine Type Communication
- NACK Negative acknowledgement
- NDI Next Data Indicator
- NR New Radio
- O&M Operation and Maintenance
- OCC Orthogonal Cover Code
- OFDM Orthogonal Frequency Division Multiplexing
- OFDMA Orthogonal Frequency Division Multiple Access
- OSS Operations Support System
- PCC Primary Component Carrier
- P-CCPCH Primary Common Control Physical Channel
- PCell Primary Cell
- PCG Primary Cell Group
- PCH Paging Channel
- PCI Physical Cell Identity
- PDCCH Physical Downlink Control Channel
- PDSCH Physical Downlink Shared Channel
- PDU Protocol Data Unit
- PGW Packet Gateway
- PHICH Physical HARQ indication channel
- PMI Precoder Matrix Indicator
- PRB Physical Resource Block
- ProSe Proximity Service
- PSC Primary serving cell
- PSCell Primary SCell
- PUCCH Physical Uplink Control Channel
- PUSCH Physical Uplink Shared Channel
- QPSK Quadrature phase shift keying
- RAT Radio Access Technology
- RB Resource Block
- RF Radio Frequency
- RLM Radio Link Management
- RNC Radio Network Controller
- RNTI Radio Network Temporary Identifier
- RRC Radio Resource Control
- RRH Remote Radio Head
- RRM Radio Resource Management
- RRU Remote Radio Unit
- RSRP Reference Signal Received Power
- RSRQ Reference Signal Received Quality
- RSSI Received Signal Strength Indicator
- RSTD Reference Signal Time Difference
- RTT Round Trip Time
- SCC Secondary Component Carrier
- SCell Secondary Cell
- SCG Secondary Cell Group
- SCH Synchronization Channel
- SDU Service Data Unit
- SeNB Secondary eNodeB
- SGW Serving Gateway
- SI System Information
- SIB System Information Block
- SINR Signal to Interference and Noise Ratio
- SNR Signal Noise Ratio
- SPS Semi-persistent Scheduling
- SON Self-organizing Network
- SR Scheduling Request
- SRS Sounding Reference Signal
- SSC Secondary Serving Cell
- TTI Transmission Time Interval
- Tx Transmitter
- UCI Uplink Control Information
- UE User Equipment
- UL Uplink
- URLLC Ultra-Reliable Low Latency Communication
- UTRA Universal Terrestrial Radio Access
- UTRAN Universal Terrestrial Radio Access Network
- V2V Vehicle-to-vehicle
- V2X Vehicle-to-everything
- WLAN Wireless Local Area Network

The invention claimed is:

1. A method performed by a wireless device, the method comprising:
  determining that an acknowledgement/negative acknowledgement (ACK/NACK) transmission and a scheduling request (SR) transmission will overlap in Physical Uplink Control Channel (PUCCH) resources;
  determining a priority associated with the ACK/NACK transmission, wherein the priority associated with the ACK/NACK transmission is determined at least in part based on a Downlink Control Information (DCI) message transmitted on a Physical Downlink Control Channel (PDCCH) and a priority level associated with a PUCCH resource carrying the ACK/NACK transmission;

comparing the priority associated with the ACK/NACK transmission with a priority associated with the SR transmission to determine which transmission has a higher relative priority; and transmitting the transmission with the higher relative priority.

2. The method of claim 1, further comprising, determining a priority associated with the SR transmission.

3. The method of claim 2, wherein the priority associated with the SR transmission is determined in accordance with a priority level associated with a logical channel associated with the SR transmission.

4. The method of claim 1, wherein the priority associated with the ACK/NACK transmission is determined in accordance with at least one of a Physical Downlink Control Channel (PDCCH) property, a Physical Downlink Shared Channel (PDSCH) property and a PUCCH property.

5. The method of claim 1, wherein the priority associated with the ACK/NACK transmission is determined at least in part based on a characteristic of a scheduling PDCCH transmission.

6. The method of claim 5, wherein the characteristic includes at least one of a search space and a control resource set used for the PDCCH transmission.

7. The method of claim 6, wherein a priority level of the search space is derived from a periodicity of the search space.

8. The method of claim 1, wherein the priority associated with the ACK/NACK transmission is determined at least in part based on an aggregation level associated with the PDCCH.

9. The method of claim 1, wherein the DCI message includes at least one of a modulation and coding scheme, a code rate, a modulation order, an indication of reference signal pattern, a time-domain resource allocation, a cyclic redundancy check (CRC) length, and a multiple input multiple output (MIMO) transmission scheme.

10. The method of claim 1, wherein the priority associated with the ACK/NACK transmission is determined at least in part based on a Radio Network Temporary Identifier (RNTI) value associated with the wireless device.

11. The method of claim 1, wherein, responsive to determining the ACK/NACK transmission and the SR transmission have a same relative priority, transmitting the transmission having an earlier transmission time.

12. The method of claim 1, further comprising, one of cancelling or interrupting the transmission with a lower relative priority.

13. A wireless device comprising a radio interface and processing circuitry configured to:

determine that an acknowledgement/negative acknowledgement (ACK/NACK) transmission and a scheduling request (SR) transmission will overlap in PUCCH resources;

determine a priority associated with the ACK/NACK transmission, wherein the priority associated with the ACK/NACK transmission is determined at least in part based on a Downlink Control Information (DCI) message transmitted on a Physical Downlink Control Channel (PDCCH) and a priority level associated with a PUCCH resource carrying the ACK/NACK transmission;

compare the priority associated with the ACK/NACK transmission with a priority associated with the SR transmission to determine which transmission has a higher relative priority; and transmit the transmission with the higher relative priority.

14. The wireless device of claim 13, further configured to determine a priority associated with the SR transmission.

15. The wireless device of claim 14, wherein the priority associated with the SR transmission is determined in accordance with a priority level associated with a logical channel associated with the SR transmission.

16. The wireless device of claim 13, wherein the priority associated with the ACK/NACK transmission is determined in accordance with at least one of a Physical Downlink Control Channel (PDCCH) property, a Physical Downlink Shared Channel (PDSCH) property and a PUCCH property.

17. The wireless device of claim 13, wherein the priority associated with the ACK/NACK transmission is determined at least in part based on a characteristic of a scheduling PDCCH transmission.

18. The wireless device of claim 17, wherein the characteristic includes at least one of a search space and a control resource set used for the PDCCH transmission.

19. The wireless device of claim 18, wherein a priority level of the search space is derived from a periodicity of the search space.

20. The wireless device of claim 13, wherein the priority associated with the ACK/NACK transmission is determined at least in part based on an aggregation level associated with the PDCCH.

21. The wireless device of claim 13, wherein the DCI message includes at least one of a modulation and coding scheme, a code rate, a modulation order, an indication of reference signal pattern, a time-domain resource allocation, a cyclic redundancy check (CRC) length, and a multiple input multiple output (MIMO) transmission scheme.

22. The wireless device of claim 13, wherein the priority associated with the ACK/NACK transmission is determined at least in part based on a Radio Network Temporary Identifier (RNTI) value associated with the wireless device.

23. The wireless device of claim 13, further configured to, responsive to determining the ACK/NACK transmission and the SR transmission have a same relative priority, transmit the transmission having an earlier transmission time.

24. The wireless device of claim 13, further configured to, one of cancel or interrupt the transmission with a lower relative priority.

* * * * *